(12) United States Patent
Krause et al.

(10) Patent No.: US 10,040,030 B2
(45) Date of Patent: Aug. 7, 2018

(54) FILTRATION DEVICE HAVING INTERNAL RECIRCULATION

(75) Inventors: Stefan Krause, Darmstadt (DE); Ulrich Meyer-Blumenroth, Idstein-Woersdorf (DE)

(73) Assignee: Microdyn-Nadir GmbH, Wiesbaden (DE)

( * ) Notice: Subject to any disclaimer, the term of this patent is extended or adjusted under 35 U.S.C. 154(b) by 929 days.

(21) Appl. No.: 13/695,620

(22) PCT Filed: Apr. 28, 2011

(86) PCT No.: PCT/EP2011/002129
§ 371 (c)(1),
(2), (4) Date: Nov. 1, 2012

(87) PCT Pub. No.: WO2011/137990
PCT Pub. Date: Nov. 10, 2011

(65) Prior Publication Data
US 2013/0043189 A1 Feb. 21, 2013

(30) Foreign Application Priority Data
May 6, 2010 (DE) .......... 10 2010 019 505

(51) Int. Cl.
*B01D 63/00* (2006.01)
*C02F 1/44* (2006.01)
(Continued)

(52) U.S. Cl.
CPC .......... *B01D 61/18* (2013.01); *B01D 61/027* (2013.01); *B01D 61/08* (2013.01); *B01D 61/145* (2013.01);
(Continued)

(58) Field of Classification Search
CPC .............. B01D 2321/185; B01D 65/08; B01D 2315/06; B01D 65/02; B01D 61/147; B01D 61/14; C02F 3/1273; C02F 1/444
See application file for complete search history.

(56) References Cited

U.S. PATENT DOCUMENTS 6,375,848 B1 * 4/2002 Cote et al. .................... 210/650
6,402,955 B2 * 6/2002 Ookata ......................... 210/636
(Continued)

FOREIGN PATENT DOCUMENTS

EP  1 034 835 A1  9/2000
EP  1 445 240 A1  8/2004
(Continued)

*Primary Examiner* — Ana Fortuna
(74) *Attorney, Agent, or Firm* — Propat, L.L.C.

(57) ABSTRACT

A device for micro-, ultra-, or nanofiltration that includes one or more flat filter modules having flat filter elements arranged in parallel and at a distance from each other and gas injectors of one or more gas lifting systems for producing a circulating cross flow directed tangentially to the surface of the flat filter elements and having at least one rising area, in which the cross flow flows substantially vertically upward, and at least one falling area, in which the cross flow flows substantially vertically downward, in which the rising area flows through 10 to 100% and the falling area flows through 10 to 100% of an inlet-flow volume of the at least one flat filter module.

27 Claims, 11 Drawing Sheets

(51) Int. Cl.
  *B01D 65/00* (2006.01)
  *B01D 39/00* (2006.01)
  *B01D 63/02* (2006.01)
  *B01D 67/00* (2006.01)
  *B01D 61/18* (2006.01)
  *B01D 61/08* (2006.01)
  *B01D 61/16* (2006.01)
  *B01D 63/08* (2006.01)
  *B01D 65/08* (2006.01)
  *C02F 3/12* (2006.01)
  *B01D 61/02* (2006.01)
  *B01D 61/14* (2006.01)

(52) U.S. Cl.
  CPC ........... *B01D 61/147* (2013.01); *B01D 61/16* (2013.01); *B01D 63/082* (2013.01); *B01D 65/08* (2013.01); *C02F 1/444* (2013.01); *C02F 3/1273* (2013.01); *B01D 2311/04* (2013.01); *B01D 2311/16* (2013.01); *B01D 2311/25* (2013.01); *B01D 2313/08* (2013.01); *B01D 2313/12* (2013.01); *B01D 2313/26* (2013.01); *B01D 2315/10* (2013.01); *B01D 2321/185* (2013.01); *C02F 2201/002* (2013.01); *C02F 2301/028* (2013.01); *C02F 2303/16* (2013.01); *Y02W 10/15* (2015.05)

(56) References Cited

U.S. PATENT DOCUMENTS

| | | | |
|---|---|---|---|
| 6,790,360 B1 * | 9/2004 | Pedersen | B01D 61/145 210/321.78 |
| 6,893,568 B1 * | 5/2005 | Janson et al. | 210/650 |
| 7,014,173 B2 * | 3/2006 | Rabie | B01D 61/18 210/138 |
| 7,022,238 B2 * | 4/2006 | Eguchi et al. | 210/650 |
| 2001/0035373 A1 | 11/2001 | Ookata | |
| 2002/0153313 A1 * | 10/2002 | Cote | 210/636 |
| 2004/0112831 A1 * | 6/2004 | Rabie et al. | 210/636 |
| 2009/0071901 A1 * | 3/2009 | Rabie | B01D 61/18 210/636 |
| 2009/0255872 A1 * | 10/2009 | Busnot et al. | 210/636 |

FOREIGN PATENT DOCUMENTS

| | | |
|---|---|---|
| JP | 04334530 | * 11/1992 |
| JP | 09 225272 A | 9/1997 |
| JP | 10033955 | * 10/1998 |
| JP | 2002 191361 A | 7/2002 |
| WO | WO 2007/022576 A1 | 3/2007 |
| WO | WO 2008/153818 A1 | 12/2008 |

* cited by examiner

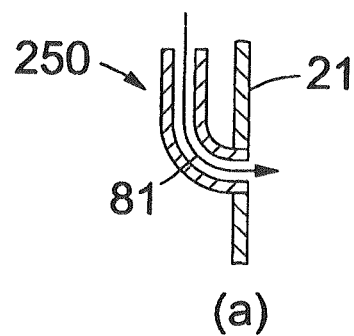
(a)
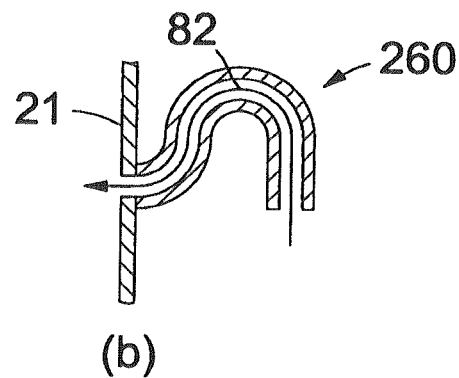
(b)
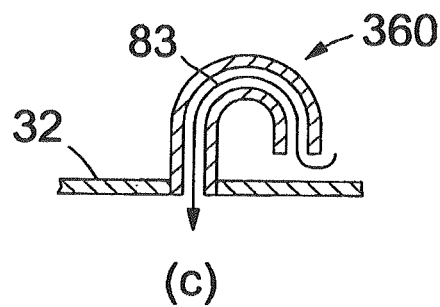
(c)
Fig. 9

FILTRATION DEVICE HAVING INTERNAL RECIRCULATION

CROSS-REFERENCE TO RELATED APPLICATIONS

This application is being filed under Rule 1.371 as a National Stage Application of pending International Application No. PCT/EP2011/002129 filed Apr. 28, 2011, which claims priority to parent application German Patent Application No. 10 2010 019 505.7, filed May 6, 2010. Both International Application No. PCT/EP2011/002129 and German Patent Application No. 10 2010 019 505.7 are hereby incorporated by reference herein in their entirety.

FIELD OF THE INVENTION

The present invention relates to a device and a method for micro-, ultra- or nanofiltration comprising one or more flat filter modules comprising flat filter elements arranged in parallel and at a distance from each other and gas injectors of a gas lifting system for generating a circulating crossflow directed tangentially to the surface of the flat filter elements.

BACKGROUND OF THE INVENTION

In a multiplicity of industrial and municipal applications, such as wastewater purification and seawater desalination, membrane-supported filtration methods, in particular crossflow filtration, have been used for decades. Liquid that is to be purified—hereinafter called feed—flows over two-dimensional porous membranes tangentially to the membrane surface. The pore size of the membranes, depending on the application, is in the range from about 10 nanometers to some micrometers. The volume of the feed that flows through, customarily termed flow, is separated from a permeate space by the membrane. Between flow and permeate space a differential pressure of about 0.1 bar to 100 bar is applied which causes a mass transport from the flow to the permeate space, wherein permeate (or filtrate) passes into the permeate space. For the membrane bioreactors (MBR) used in wastewater treatment, preferably a differential pressure in the range from 0.02 to 0.4 bar is employed.

The membrane is usually constructed as a two-layer composite of a support nonwoven and a porous membrane layer. Preferably, the porous membrane layer comprises polyether sulfone, polysulfone, polyacrylonitrile, polyvinylidene fluoride, polyamide, polyetherimide, cellulose acetate, regenerated cellulose, polyolefin or fluoropolymer. The porous membrane layer is generated, for example, by coating a nonwoven or woven fabric with polymer solution and precipitating out the polymer in a subsequent phase inversion step. Alternatively thereto, a polymer film is stretched in a suitable manner, wherein pores are formed in the polymer film. The stretched polymer film is then laminated onto a support nonwoven for mechanical stabilization. Filtration membranes produced by these methods are commercially obtainable, e.g. under the name NADIR® membranes (MICRODYN-NADIR GmbH, Wiesbaden) or CELGARD® Flat Sheet Membranes (Celgard Inc., Charlotte, N.C., USA).

Components present in the feed, the diameter of which is too great to pass through the membrane pores are retained on the membrane surface and remain in part adhering. In crossflow filtration, feed permanently flows over the membrane surface in order to transport away the retained components (retentate) from the membrane surface. In this manner, continuous filtration operation with constant permeate flux is possible. The crossflow mode of operation results in the typical structure of membrane modules having three connections or passages, for feed, retentate and permeate. Membrane modules are equipped with a housing or frame which is closed or open on one side or many sides, and in which flat filter elements, or in rare cases wound filters, are mounted. According to the structure, a membrane module, in addition to passages between the filter elements or passages between the windings of the wound filter, has connections optionally arranged on the walls of the housing for feed, retentate and permeate.

In a flat filter element, the permeate space is bordered by two separate membranes or by two part-surfaces of a one-piece membrane. Between the two membranes or part surfaces, a porous permeate spacer is arranged which firstly acts as support structure for the sensitive membranes which are loaded by a transmembrane differential pressure of up to 100 bar, and secondly provides passageways through which the permeate runs off along the insides of the membranes/part-pieces. In a membrane module having a plurality of flat filter elements, the permeate space is composed of the totality of the permeate spaces of all flat filter elements.

In flat filter modules, a multiplicity of planar flat filter elements is arranged in a stack in parallel to one another. Between each two adjacent flat filter elements spacers are arranged which keep a passageway open through which the feed and retentate can flow in and off. The spacers comprise, e.g., washers made of a polymeric material which are arranged between the rim regions or edges, in particular the corners, of each two adjacent flat filter elements. Alternatively thereto, a frame or housing can be used which is equipped with equidistant grooves for receiving the edges of the flat filter elements.

An important area of use of filtration devices having flat filter modules is membrane bioreactors (MBR) for wastewater treatment. In MBR processes, the wastewater is treated in a plurality of steps physically, chemically and biologically until it reaches the membrane. By mechanical-physical pretreatments, the wastewater is freed from particles, fibers and coarse materials. In the coarse filtration, large particles, which can cause damage to the membranes, are removed by grills and sieves. In the MBR process, usually fine sieves are used for the prefiltration in a size range from 0.05-3 mm. The wastewater is in addition freed from heavy particles (e.g. sand) and oils and fats by a sand and fat trap.

In a further process step, the wastewater is treated biologically and chemically. In an activation tank, sludge (biomass) is situated together with microorganisms which enzymatically react and eliminate high-molecular-weight organic pollutants. The substances remaining after the enzymatic reaction are utilized by the microorganisms either for cell buildup or for energy production with oxygen consumption. The resultant oxygen consumption needs to be met by a sufficient oxygen supply, for which reason activation tanks are provided with aeration units. A precondition for the functioning of the process is the dwelling of the biomass in the system. Therefore, the biomass is separated off from the purified wastewater by a membrane filtration and recirculated to the activation tank. Overgrown activated sludge is removed as excess sludge. Before the biomass is separated from the water, further chemical treatments are performed. In this case, in combination with a filtration stage, usually various precipitants and flocculants such as, for example, iron chloride or polymers, are used for removing liquid components dissolved colloidally and as particles.

An essential advantage of MBR systems is the solids-free effluent. This means that no bacteria are situated in the effluent of the membrane activation system and even viruses may optionally be separated off by sorption effects. The residual organic fouling is strongly reduced thereby. The hygienically relevant guide values of the EU Bathing Water Directive [75/160/EEC, 1975] are complied with by MBR. In addition, the solids-free effluent offers great potential for wastewater reuse in the municipal and also industrial sectors. Here, by water recycling up to closing water circuits, large savings in water are achieved. A further advantage is that this process, owing to the adjustable high DM content and dispensing with secondary clarification tanks, has only a low space requirement. On account of the non-dependence on the sedimentation behavior, the activated sludge concentration (biomass concentration, expressed as DM—dry matter) can be increased compared with conventional processes. Membrane bioreactors are usually operated with DM concentrations from 8 to 15 g/l. Compared with conventional activation processes, the reactor volume of a membrane bioreactor can be reduced in such a manner that high space loadings are possible.

One problem with use of membrane filters in the field of wastewater purification is what is termed "membrane fouling" which is that deposits form on the membranes which reduce the flow of the liquid that is to be purified.

In the prior art, a multiplicity of filtration devices having flat filter modules and gas lifting systems are known.

EP 1 445 240 (whose United States equivalent is U.S. Pat. No. 6,245,239) describes a biological membrane reactor having a cyclically operated aeration system. The reactor comprises a feed-filled tank having one or more membrane modules which comprise optionally flat filter modules made of flat filter elements arranged vertically and at a distance from one another. Air is supplied to the feed using a cyclically operated aeration system. The aeration system comprises aeration nozzles which are arranged in the tank beneath the flat filter modules.

The filtration devices that are known in the prior art have some disadvantages:
  in order to achieve good filtration efficiency, a feed volume is required that is at least twice as high as the free flow volume of the filter modules of the filtration device; correspondingly, the filtration devices have a space or area requirement which corresponds to about twice that of their base area;
  for generating a sufficiently intensive crossflow streaming, a large liquid volume is circulated, in such a manner that in running filtration operations, considerable amounts of energy are consumed;
  mechanical in-situ cleaning of the filtration membranes by granules is problematic, because a considerable part of the granules, owing to the crossflow streaming, sediments in the clarification tank/filtration tank surrounding the filtration device and/or flows off therefrom and downstream pumps are damaged in the long term.

SUMMARY OF ADVANTAGEOUS EMBODIMENTS OF THE INVENTION

The object of the present invention is to overcome the above disadvantages and to provide a filtration device having increased filtration efficiency and reduced energy and space requirements. In particular, the purpose of the invention is to reduce the energy requirement of one or a plurality of gas lifter systems used for generating crossflow streaming. Furthermore, a filtration device is to be provided in which the surfaces of the filtration membranes are cleaned in situ during the running filtration operation and the permeate throughput is maintained at a high level.

This problem is solved by a device for micro-, ultra- or nanofiltration comprising one or more flat filter modules comprising flat filter elements arranged in parallel and at a distance from one another and gas injectors of one or more gas lifting systems for generating a circulating crossflow streaming directed tangentially to the surface of the flat filter elements and having at least one rising area in which the crossflow streaming flows substantially vertically upward, and at least one falling area in which the crossflow streaming flows essentially vertically downward, and the rising area passes through 10 to 100%, and the falling area 10% to 100%, of a flow volume of the at least one flat filter module.

Developments of the device according to the invention are characterized in that:
  the rising area passes through 10 to 80%, preferably 30 to 60%, and in particular 45 to 55%, of the flow volume of the flat filter modules and the falling area passes through 90 to 20%, preferably 70 to 40%, and in particular 55 to 45%;
  gas outlets of the gas injectors of a gas lifting system are arranged beneath the at least one flat filter module for giving off a gas such as air and vertical projections of the gas outlets pass through 10 to 80%, preferably 30 to 60%, and in particular 45 to 55% of a horizontal cross sectional area AF of the at least one flat filter module;
  gas outlets of the gas injectors of a further gas lifting system are arranged below the at least one flat filter module for giving off a gas such as air and vertical projections of the gas outlets pass through 90 to 20%, preferably 70 to 40%, and in particular 55 to 45%, of a horizontal cross sectional area AF of the at least one flat filter module;
  the device comprises m flat filter modules, of which n flat filter modules are equipped with gas injectors of a gas lifting system, wherein m and n are natural numbers where m≥2 and m≥n≥1, the gas injectors are equipped with gas outlets and vertical projections of the gas outlets pass through 10 to 100%, preferably 30 to 60%, and in particular 45 to 55%, of a horizontal cross sectional area AF of each of the n flat filter modules;
  (m−n) flat filter modules are equipped with gas injectors of a further gas lifting system, wherein the gas injectors are equipped with gas outlets and vertical projections of the gas outlets pass through 10 to 100%, preferably 30 to 60%, and in particular 45 to 55%, of a horizontal cross sectional area AF of each of the m (m−n) flat filter modules;
  the device comprises a housing having side walls and optionally a base wall;
  the housing comprises at least one feed line for feeding feed, and at least one outlet line for conveying away feed and/or retentate;
  the at least one outlet line is constructed in the manner of a siphon in such a manner that feed and/or retentate flowing outward from the interior of the housing through the outlet line flows vertically upward for at least a part section;
  the at least one outlet line is arranged in an upper third of a side wall and preferably comprises a diaphragm for retaining solids in the interior of the housing;
  the at least one outlet line is arranged in the base wall and preferably comprises a hood for retaining solids in the interior of the housing;

the at least one feed line is constructed in the manner of a siphon in such a way that feed flowing from the outside through the feed line into the interior of the housing flows vertically downward for at least a part section;

the device comprises a lower frame; and the housing contains granules for cleaning the surfaces of the flat filter elements, in particular granules made of particles of a polymeric material having a specific density from 1.0 to 1.5 kg/dm$^3$.

For the purposes of the invention, the expression "flat filter module" designates a single flat filter element or a stack of flat filter elements arranged in parallel and at a distance from each other. A flat filter module according to the invention is equipped with a housing or frame that is closed or open on one or more sides, in which the flat filter element(s) are mounted. In addition, flat filter modules without frames are provided, wherein adjacent flat filter elements are each mechanically coupled by a connecting permeate tube and/or by spacers. The spacers are preferably constructed as cylindrical or rectangular distancing pieces made of a polymeric material and are arranged in the edge region and in particular at the corners of two adjacent flat filter elements. Expediently, the spacers are coupled to the flat filter elements by clips or adhesive bonds. The housing, the frame or the spacers give the flat filter module mechanical stability and protect the sensitive membranes of the flat filter elements from crack formation on tension or pressure load.

According to the invention, the expression "flow volume" designates the open volume fraction, i.e. the volume fraction through which a liquid can flow, of a flat filter module. The size of the flow volume is equal to the product of the number and area of the flat filter elements with the distance between each two adjacent flat filter elements according to the mathematical relation: flow volume=number×area×distance. In this case, for the two outer flat filter elements of the flat filter module, an open volume fraction of the size area× spacing/2 is used. The size of the flow volume corresponds roughly to the external volume of the flat filter module minus the product of number, area and thickness of the flat filter elements.

The expressions "rising area" and "falling area" designate preset part volumes of the flow volume of the flat filter elements, wherein the rising areas are charged with a gas, such as air, using the gas injectors of one or more gas lifting systems. As gas lifting systems, preferably air-lift pumps are used. In the prior art, air-lift pumps are used especially frequently for circulating liquids having a solids content, in particular activated sludge in sewage treatment plants.

In a gas lifting system such as an air-lift pump, by localized injection of a transport gas into a liquid that is to be transported, an upwardly directed flow is generated. For injection of the gas, the gas lifting system comprises one or more gas injectors constructed as hollow bodies, in particular as tubes having one or more gas outlets or gas nozzles preferably arranged as two dimensional. The injected gas decreases the density of the liquid locally, wherein, owing to the Archimedes principle, a buoyancy force acts against the direction of gravity, i.e. an upwardly directed buoyancy force. As transport gas, preferably air is used which is injected into the liquid at a slight overpressure using a pressure-generating appliance, for example a fan, a compressor or the like. Generally, gas lifting systems comprise a tube or a riser pipe having a lower intake opening and an upper outlet opening. The outlet opening is vented to the surrounding atmosphere in such a manner that the transport gas which is injected into the liquid between the intake opening and the outlet opening can escape. The riser pipe delimits the transport or rising area in which the liquid is transported upward from a surrounding liquid volume. In order to employ the principle of the gas lifting systems, a riser pipe, however, is not absolutely necessary. For the circulation of liquids, in particular of activated sludge or feed in a clarification tank, mostly gas lifting systems without a riser pipe are used. In this case, at predetermined positions within the clarification tank, air is injected into the activated sludge or feed, wherein in the liquid volume situated above the injection sites, rising areas form with upwardly flowing liquid. The cross section or the lateral extent of the rising areas is determined by means of the respective lateral arrangement of the gas outlets or gas nozzles of the gas injectors of the gas lifting system(s). The transport gas injected into the rising areas ascends to the surface of the liquid and is given off to the atmosphere, wherein the density of the liquid close to the surface rises again to its usual value. In a volume surrounding the rising area liquid falls downward in order to replace the liquid transported upward in the rising area. The volume passed through by the liquid flowing or falling downward is termed hereinafter the falling area. In addition to the direction of flow, the liquid volume is differentiated in the rising area from the liquid volume in the falling area by an increased content of gas bubbles.

In order to supply with gas the gas injectors of a first part of the flat filter modules independently of the other flat filter modules, the use of two gas lifting systems or pressure-generating appliances such as fans or compressors is provided. Furthermore, in the context of the invention, it is proposed to turn on and turn off the gas supply of the flat filter modules by means of separately adjustable valves. For this purpose the adjustable valves are arranged in the feed lines of the gas lifting system or else in the flat filter modules. When adjustable two-way valves are used, the use of a further fan/compressor can be dispensed with. Using one fan/compressor, depending on the valve setting, a first part of the flat filter modules can be charged with gas whereas a second part can be decoupled from the gas supply. After switching over the two-way valve(s), the second parts of the flat filter modules are supplied with gas, whereas the first part is decoupled from the gas supply. Accordingly, a first and second part of the flat filter modules can be charged alternately with gas.

In addition, a method is proposed for the micro-, ultra- or nanofiltration of liquids using a device comprising one or more flat filter modules made of flat filter elements arranged in parallel and at a distance from one another, and gas injectors of one or more gas lifting systems, wherein a circulating crossflow streaming is directed tangentially toward the surface of the flat filter elements having at least one rising area in which the crossflow streaming flows substantially vertically upward and at least one falling area in which the crossflow streaming flows substantially vertically downward, and the rising area passes through 10 to 100% of a feed volume of the at least one flat filter module and the falling area passes through 10 to 100%.

BRIEF DESCRIPTION OF THE FIGURES

The invention will be described in more detail hereinafter with reference to drawings (figures). In the drawings:

FIG. 9 shows feed lines and outlet lines for feed and retentate;

DETAILED DESCRIPTION OF ADVANTAGEOUS EMBODIMENTS OF THE INVENTION

Figure 1:
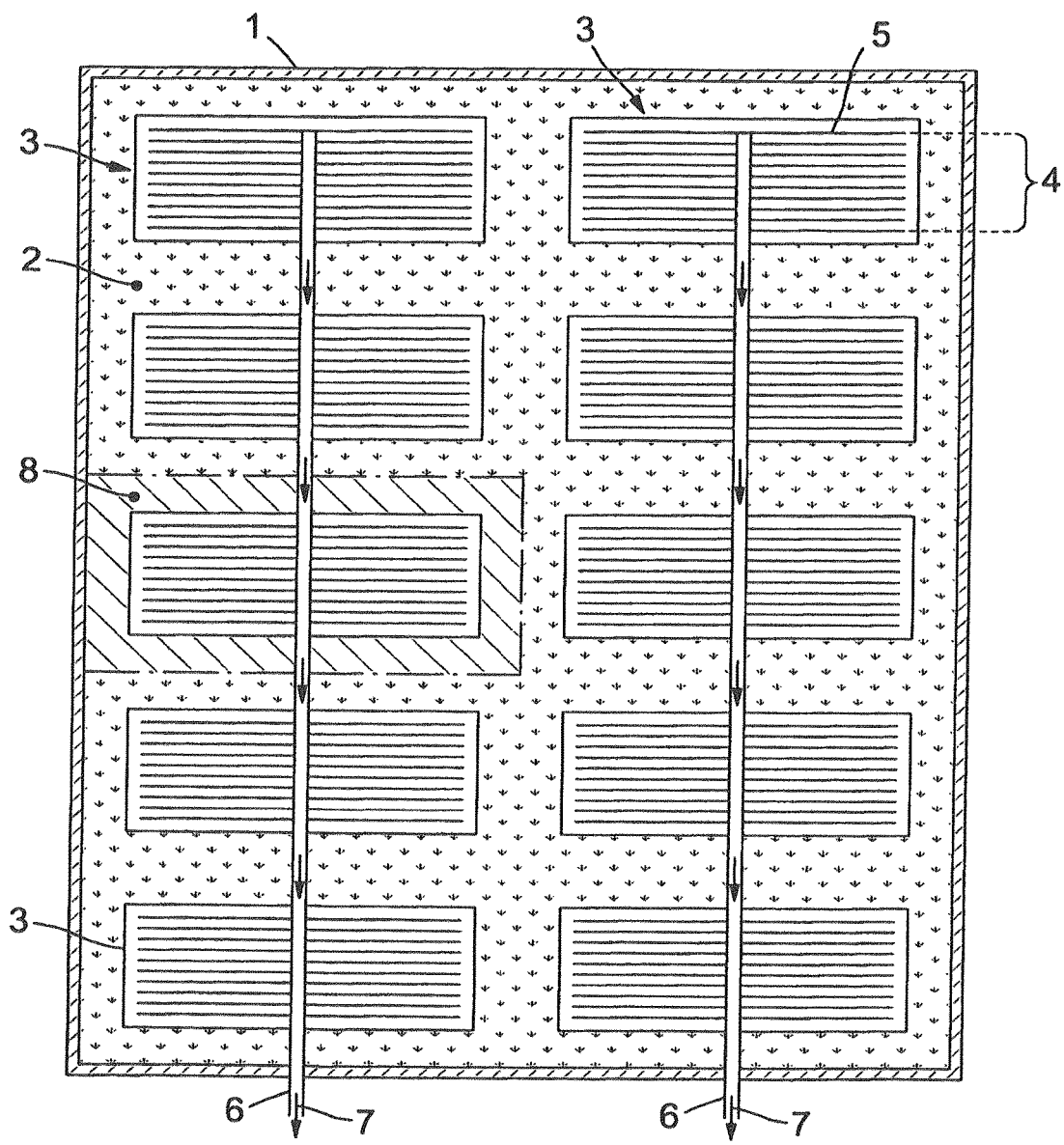
FIG. 1 shows a clarification tank having a plurality of filtration devices connected to each other.
Figure 2:
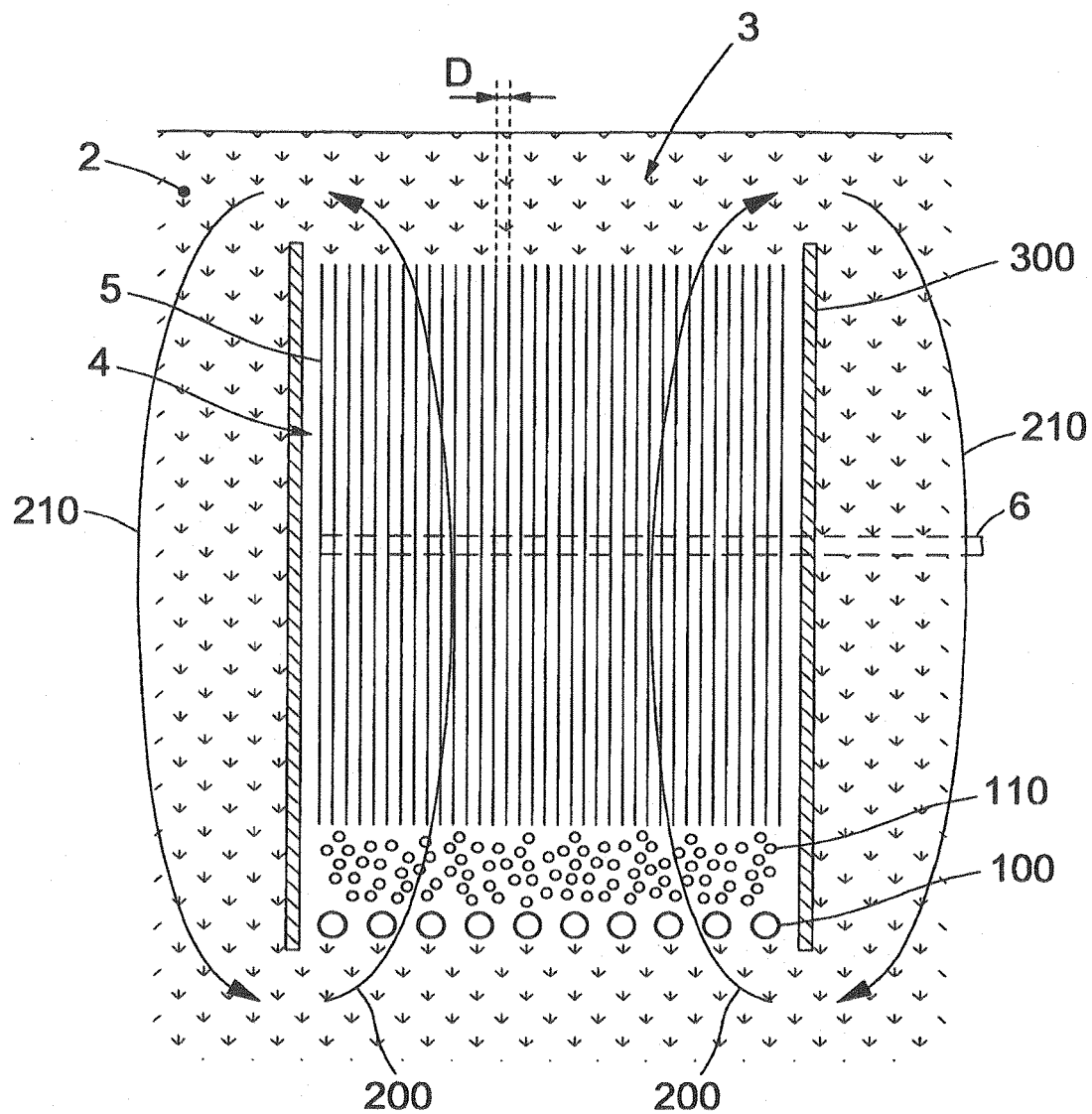
FIG. 2 shows a known filtration device.

FIG. 1 shows schematically a plan view of a clarification tank 1 filled with activated sludge or feed 2 having a plurality of filtration devices 3 connected to each other via permeate lines 6, which filtration devices each contain one or more stack-shaped flat filter modules 4 of flat filter elements 5. The permeate space of each flat filter element 5 is connected to one of the permeate lines 6 in such a manner that permeate can flow off and, as indicated by direction arrows 7, can be drained off from the permeate space via the permeate lines 6. Filtration devices 3 usual in the prior art typically have a box-shaped frame open at the bottom and top sides which acts as a support structure for the flat filter modules 4. The frame can be constructed as a housing having 1 to 4 side walls. FIG. 2 shows a sectional view of a known filtration device 3 having a flat filter module 4 of flat filter elements 5 and side walls 300. A distance between each two adjacent flat filter elements 5 is indicated by D. Below the flat filter module 4, gas injectors 100 of a gas lifting system are arranged. The gas injectors 100 are connected via lines (which are not shown) to a fan or a compressor via which a gas, in particular air, can be supplied at low pressure and at a preset transport rate ($m^3/h$). At the top side thereof facing the flat filter elements 5, the gas injectors 100 are equipped with gas outlets through which the gas is given off into the activated sludge or feed 2 in the form of bubbles 110. Owing to the gas bubbles 110, the local density of the feed 2 is decreased, in such a manner that it is displaced in accordance with the principle of Archimedes or is exposed to a buoyancy force directed vertically upward. As a consequence, a continuous crossflow streaming develops which is directed vertically upward and tangentially to the surface of the flat filter elements 5, which crossflow streaming is indicated in FIG. 2 by direction arrows 200. The upwardly flowing feed 2 is replaced by "fresh" more or less gas-free feed 2 which flows in from the area beneath the gas injectors 100. Accordingly, a circulating flow develops with upwardly directed crossflow fractions 200 and downwardly directed backflows 210. In the prior art, the gas injectors 100 or the gas outlets are arranged in such a manner below the flat filter modules 4 that the upwardly directed crossflow streaming 200 passes through the entire flow volume of the flat filter module 4, while the downwardly directed backflow 210 is localized outside, i.e. in the feed 2 surrounding the filtration device 3. The flow volume of the flat filter module 4, the size of which is given by the product (number of flat filter elements 5)×(area of a flat filter element 5)×(distance D between each two adjacent flat filter elements 5), acts as rising area of the gas lifting system. The volume region enclosing the filtration device 3 accordingly acts as falling area of the gas lifting system. The falling area is marked in the plan view of FIG. 1 by the hatched area 8. Usually, the clarification tank 1 or the filtration devices 3 are dimensioned relative to one another in such a manner that the sum of the throughput volumes of all flat filter modules 4 roughly corresponds to half of the feed volume 2 contained in the clarification tank 1. If this volumetric ratio is roughly complied with, the feed 2 is recirculated in the crossflow recirculation 200, 210 in the ratio 1:1. This fact is reflected to scale in FIG. 1, wherein the area 8 is about as big as the cross sectional area of a flat filter module 4 and the sum of the cross sectional areas of all flat filter modules 4 and the surrounding areas 8 corresponds to the cross sectional area of the clarification tank 1.

Figure 3:
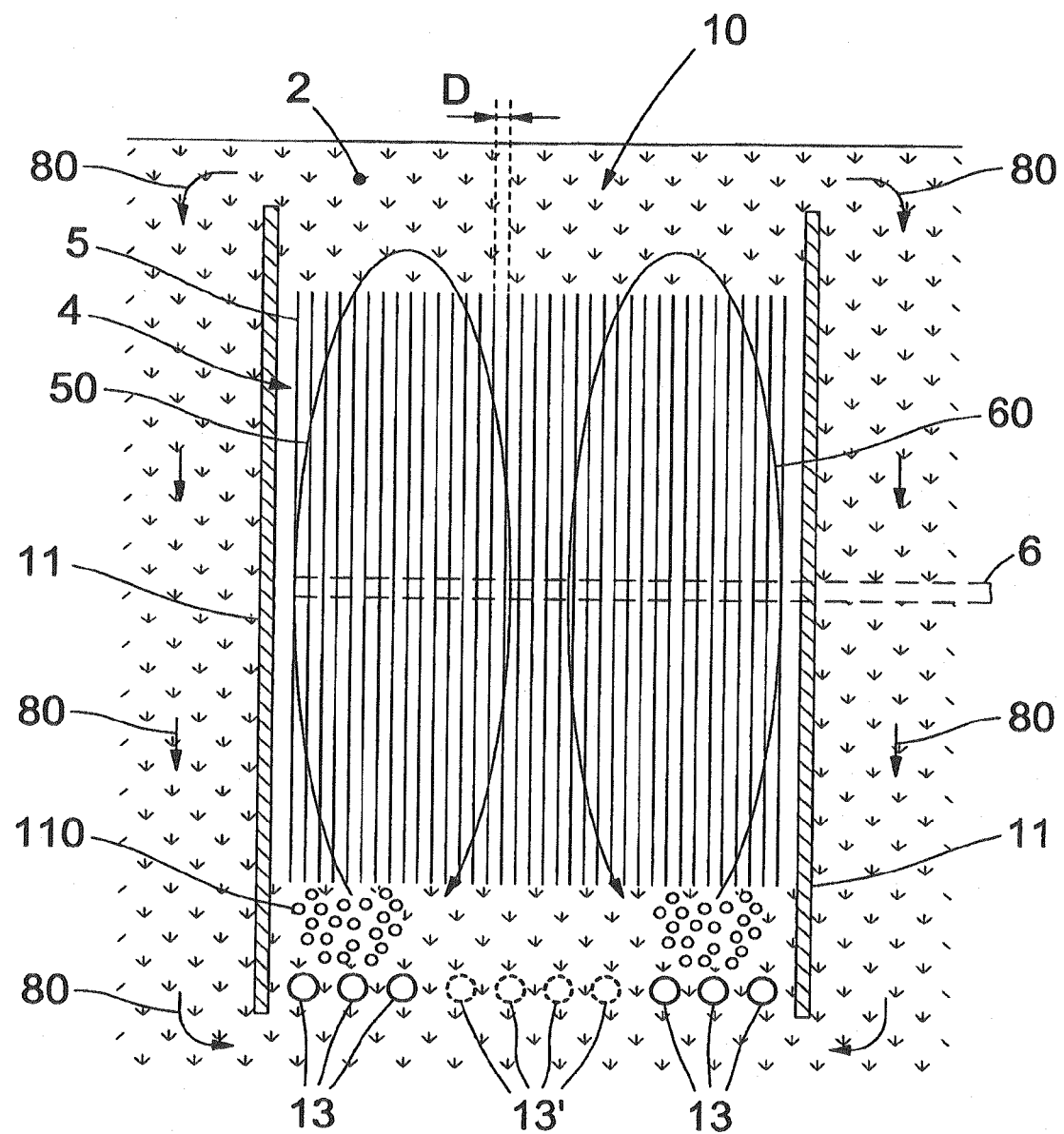
FIG. 3 shows a first filtration device according to the invention.

FIG. 3 shows a first filtration device 10 according to the invention having a housing with side walls 11, a flat filter module 4 having flat filter elements 5 and gas injectors 13 which are connected to a gas lifting system. The pressure-generating appliance of the gas lifting system, which is preferably a fan, and also the supply lines from the pressure-generating appliance to the gas injectors 13 are not shown in FIG. 3 in order to keep the picture clear. According to the invention it is provided that one or more filtration devices are supplied by one or more, in particular two, pressure-generating appliances. Accordingly, the invention firstly relates to filtration devices having gas injectors 13 and connections for connecting the gas injectors 13 to a piping network of one or more pressure-generating appliances, and secondly filtration devices which, in addition to the gas injectors 13, also have a dedicated pressure-generating appliance.

The distance between each two adjacent flat filter elements 5 is indicated in FIG. 3 with D. The filtration device 10 differs from known devices in that a circulating crossflow streaming 50, 60 is substantially restricted to the internal volume of the filtration device 10, wherein a rising area of the gas lifting system passes through 10 to 80% of flow volume of the flat filter module 4 and a falling area of the gas lifting system passes through 90 to 20% of the flow volume of the flat filter module 4.

In addition FIG. 3 shows optional gas injectors 13' (drawn with dashed lines), that can be connected to a further gas lifting system and can be supplied with gas independently of the gas injectors 13. The gas injectors 13 and 13' are provided for alternating operation which permits the direction of the circulating crossflow streaming 50, 60 to be reversed. A reversal of the direction of the circulating crossflow streaming 50, 60 is advantageous in the use of granules for mechanical cleaning of the membrane surfaces. Such granules which preferably consist of polymeric particles having a specific density in the range from 1.0 to 1.5 kg/dm³, are entrained by the recirculating crossflow streaming 50, 60, wherein they gently remove abrasively fouling deposits formed continuously on the membrane surfaces. On account of the gravity acting on the granule particles, the velocities of the granule particles relative to the membrane surface differ considerably from each other in the rising and falling areas, i.e. in the upward and downward flowing crossflow streaming. Therefore, their cleaning action also differs, wherein the higher relative velocity of the granule particles in the falling areas causes a more effective removal of the fouling deposits. By reversing the direction of the circulating crossflow streaming 50, 60 at regular intervals of time it is possible to ensure uniform cleaning of the membrane surfaces over the entire flow volume of the filtration device.

Figure 4:
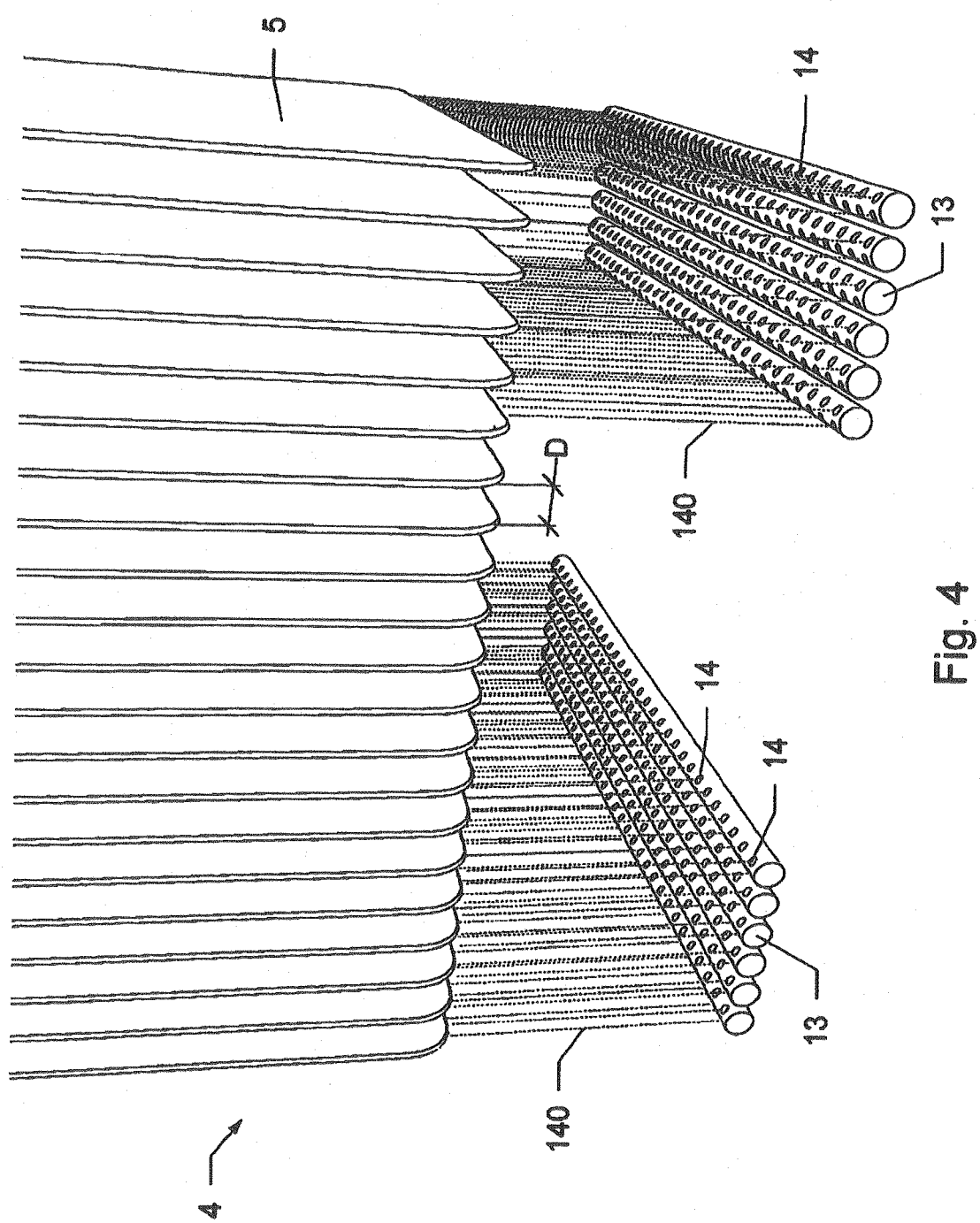
FIGS. 4-5 show perspective partial views of the filtration device of FIG. 3.

FIG. 4 gives a perspective partial view of the filtration device 10. The gas injectors 13, on the top side thereof facing the filtration module 4, have gas outlets 14. Vertical projections 140 of the gas outlets 14 pass through defined areas of the flow volume of the flat filter module 4. Each of the vertical projections 140 corresponds to the "ideal" path of a gas bubble which ascends from one of the gas outlets 14 without lateral deflection to the flat filter module 4. On account of turbulence in the liquid 2, the actual path of each ascending gas bubble differs from the vertical projection 140. Owing to the chance, statistically normally distributed lateral deflections (random walk) of each ascending gas bubble, the totality of the paths of the gas bubbles exiting from a gas outlet 14 passes through a rotationally symmetrical conical volume (bubble cone) for the respective vertical projection 140, the starting point or tip of which forms the respective gas outlet 14. Preferably according to the invention, the gas injectors 13 are constructed in such a manner that the gas outlets 14 thereof are arranged in horizontally orientated contiguous surface regions and are equally spaced from each other laterally. The lateral distance of adjacent gas outlets 14 is 0.2 to 50 mm, and so the associated bubble cones overlap or combine after an ascension distance of 1 to 10 cm. According to the invention, this fact is designated by the expression "vertical projections which pass through a horizontally arranged surface of predetermined size".

Figure 5:
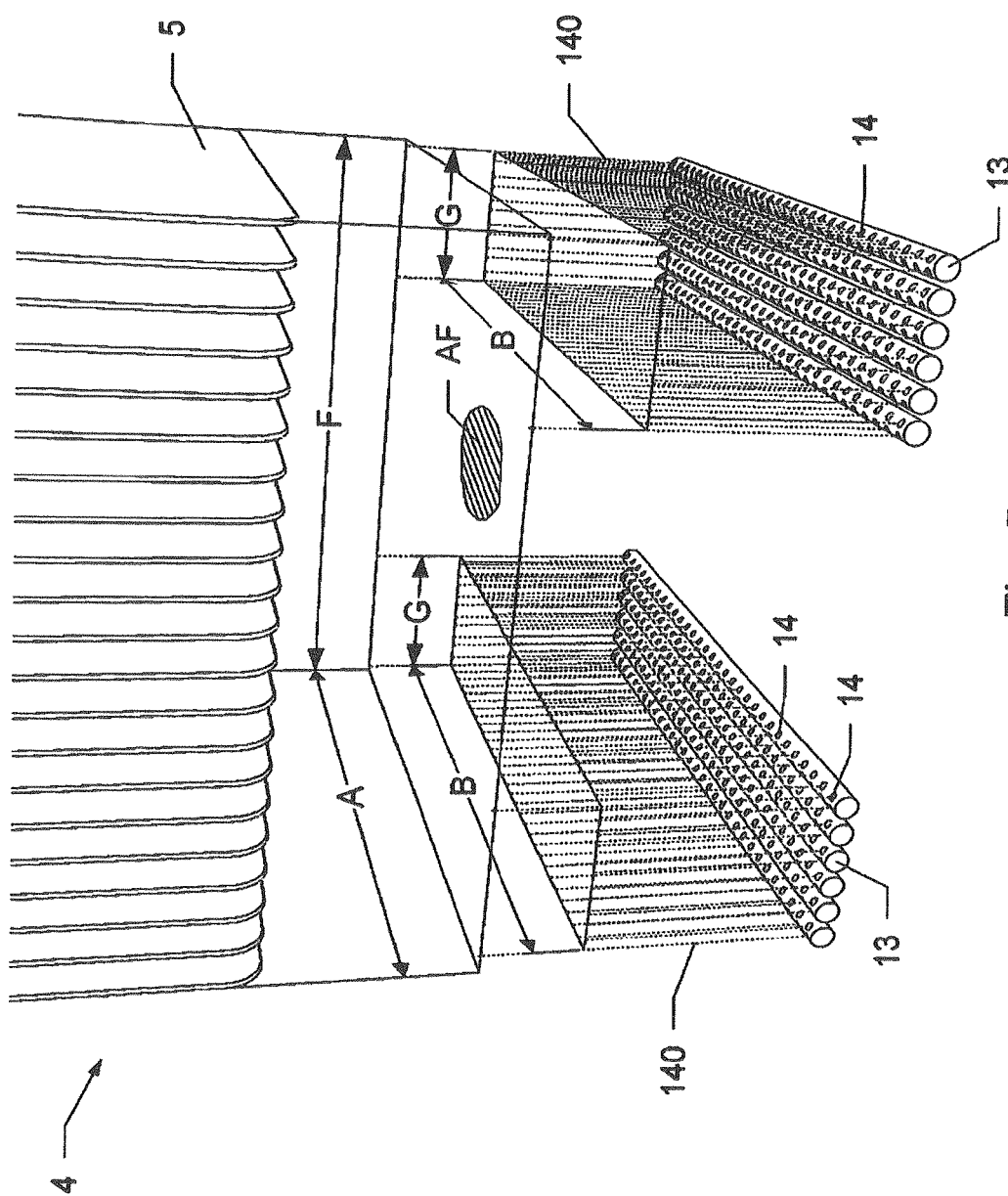

In FIG. 5 the arrangement by area of the gas outlets 14 is shown clearly. Accordingly, the gas outlets 14 are arranged in two equally large areas, each of which has a length B and a width G. The area supplied with gas by the gas outlets 14 therefore has a size of 2·B·G. In addition, in FIG. 5, a horizontal cross sectional area AF of the flat filter module 4 is shown having a length of A and a width of F, wherein the cross sectional area AF is only indicated by a small hatched part area, in order not to cover the perspective view of other parts of FIG. 5. According to the invention, the fraction of the cross sectional area AF which the vertical projections 140 of the gas outlets 14 pass through is 10 to 80%, preferably 30 to 60%, and in particular 45 to 55%. According to the arrangement shown in FIG. 5, these conditions conform to the following mathematical relations:

$$0.1 \cdot A \cdot F \leq 2 \cdot B \cdot G \leq 0.8 \cdot A \cdot F; \text{ and in particular}$$

$$0.3 \cdot A \cdot F \leq 2 \cdot B \cdot G \leq 0.6 \cdot A \cdot F$$

In general, the gas outlets 14 can be arranged in any desired manner such that the vertical projections 140 thereof pass through a contiguous part surface, or a plurality of about 2 to 4 part surfaces separated from one another of any desired shape. According to the invention, however, the symmetrical configuration shown in FIGS. 3 to 5 with two rectangular part surfaces arranged below the left and right hand side of the flat filter module 4 is preferred.

Expediently, the gas injectors 13 have a structure customary in the prior art and comprise lines or tubes, the wall of which has numerous openings, and the outside of which is encased by an elastic, liquid-impermeable membrane having fine slots. The elastic membrane is pretensioned in such a manner that the fine slots which act as gas outlets 14 behave as one-way valves. As soon as the gas pressure in the gas injector 13 and therefore on the inside of the elastic membrane exceeds the hydrostatic pressure of the surrounding liquid, gas is forced through the slots and given off into the surrounding liquid in the form of fine bubbles. If the gas pressure in the gas injectors 13 is lower than the hydrostatic pressure of the surrounding liquid, the slots in the membrane are closed, in such a manner that no gas can exit and no liquid can enter into the gas injectors 13.

As indicated in FIG. 3 by direction arrows 80, in the liquid volume 2 surrounding the filtration device 10, a shunt circuit develops. The shunt circuit 80 is formed because, firstly, permeate which flows out of the flat filter elements 5 is replaced by feed or surrounding liquid 2 and secondly because some of the circulating crossflow streaming 50, 60 interacts with the liquid volume 2 surrounding the filtration device 10.

According to the invention, the gas lifting system of the filtration device(s) is constructed in such a manner that it is suitable for giving off a gas stream from 0.1 to 0.5 m³ per m² of membrane surface area of the flat filter elements and per hour to the activated sludge or feed 2. For this purpose, the pressure-generating appliance of the gas lifting system such as, for example, a fan or a compressor, is equipped with a controllable drive which permits the gas rate transported per unit time (m³/h) to be controlled and adjusted to the value required for the entire membrane surface area of one or more of the filtration devices according to the invention. In addition, the pressure-generating unit is designed in such a manner that, even at high transport rates, the pressure required at the gas injectors for gas delivery is generated in order to overcome the hydrostatic pressure of the feed 2 and the resistance to opening of the gas outlets.

In operation, the volumetric flow rates of the various liquids moved in the filtration device are roughly in the following ratio:

$$\text{recirculating crossflow} = 100 \times \text{ to } 300 \times \text{permeate flux} \quad \text{(i)}$$

$$\text{feed flow} = 4 \times \text{ to } 6 \times \text{permeate flux} \quad \text{(ii)}$$

Relation (i) states that the volume of the crossflow flowing through the flat filter modules per unit time, i.e. of the feed flowing up and downward or recirculating in the rising and falling areas, is 100- to 300-times the permeate volume removed from the flat filter modules. Analogously thereto, relation (ii) states that the volume of the (fresh) feed fed per unit time is 4- to 5-times the permeate volume. In addition, owing to the conservation of mass, the following relationship applies:

$$\text{Feed volume} = \text{retentate volume} + \text{permeate volume} \quad \text{(iii)}$$

It is necessary to take into account here that owing to the mode of construction of the flat filter modules and also of the crossflow conducted in an (open) circuit, the feed and retentate streams mix continuously and are virtually inseparable.

Figure 6:
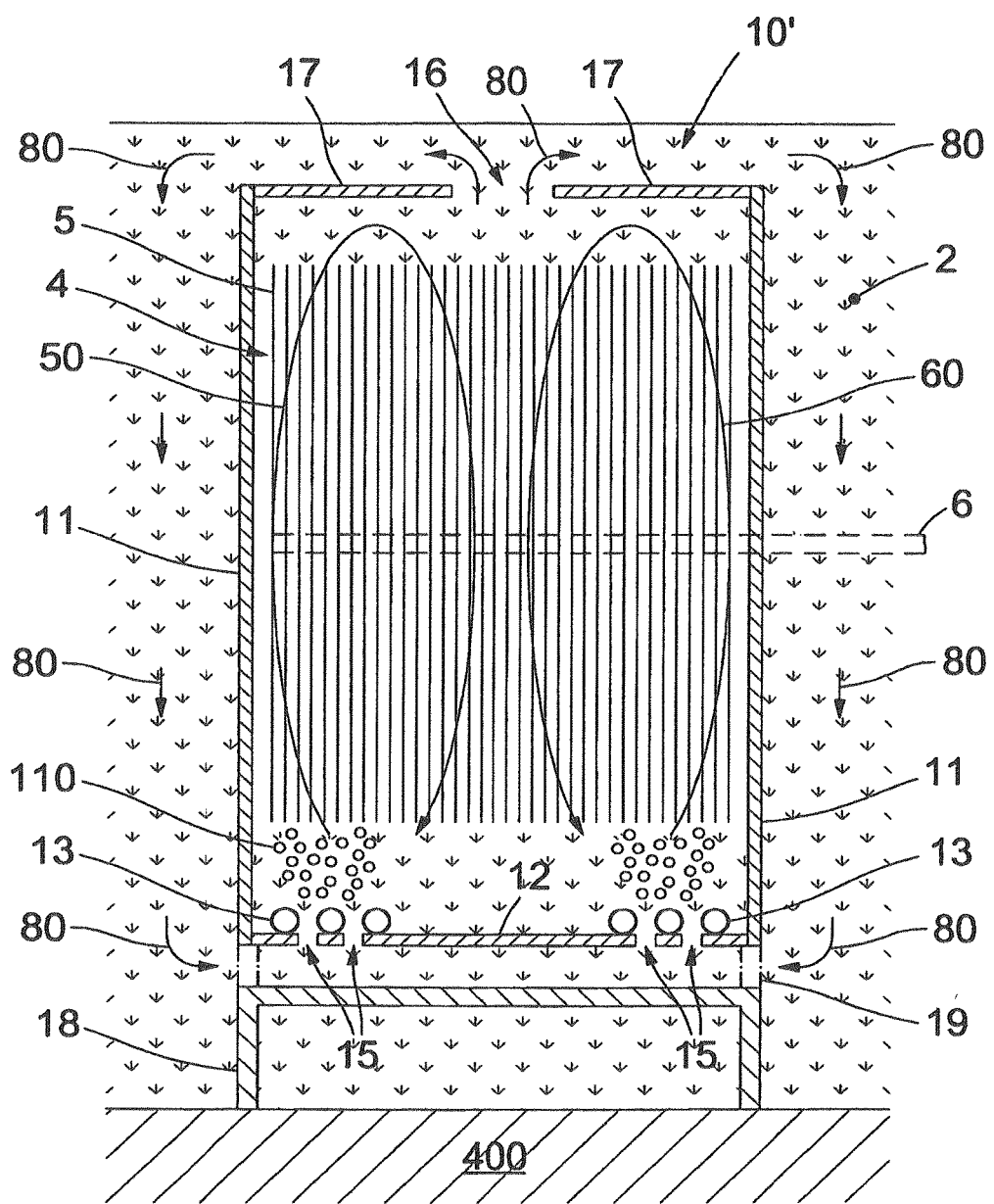
FIGS. 6-8 show further embodiments according to the invention of filtration devices.

In FIG. 6, a further example of a filtration device 10' according to the invention is shown that is based on the construction principle shown in FIGS. 3 to 5, wherein a rising area passes through 10 to 80%, preferably 30 to 60%, and in particular 45 to 55%, of the flow volume of a flat filter module 4 and a falling area passes through 90 to 20%, preferably 70 to 40%, and in particular 55 to 45%, of the flow volume of the flat filter module 4. The rising area is characterized in that below the flat filter elements of the flat filter module 4, gas injectors 13 with gas outlets are arranged. The filtration device 10' comprises a housing having four substantially closed side walls 11 and is equipped on the top side thereof with diaphragms 17 that delimit an outlet line 16 for feed and/or retentate. The diaphragms 17 prevent solids, such as optionally used granules for cleaning the surfaces of the flat filter elements 5, being flushed out of the interior of the filtration device 10'. The specific density of the optionally used granules is greater than the specific density of water that is 1 kg/dm³. Accordingly, granule particles in the liquid 2 are only suspended in the rising area of the crossflow streaming 50, 60 or entrained upward. Near the surface of the liquid at the reversal points of the crossflow streaming 50, 60, the granule particles are entrained downward or sink downward owing to gravity. The diaphragms 17 which are preferably constructed in the manner shown in FIG. 6 as flat horizontally arranged wall elements, are a virtually insuperable barrier for the granule particles. In a bottom area of the filtration device 10', gas injectors 13 are arranged. Below the gas injectors 13, a base wall 12 with feed lines or passageways 15 for feed is provided. Preferably, the filtration device 10' comprises a lower frame 18 which rests on the base 400 of a container for the liquid 2 that is to be purified and determines the vertical position of the gas injectors 13 and the flat filter module 4 in the liquid 2. The further reference signs of FIG. 6 have the same meaning as explained above in connection with FIG. 3.

Figure 7:
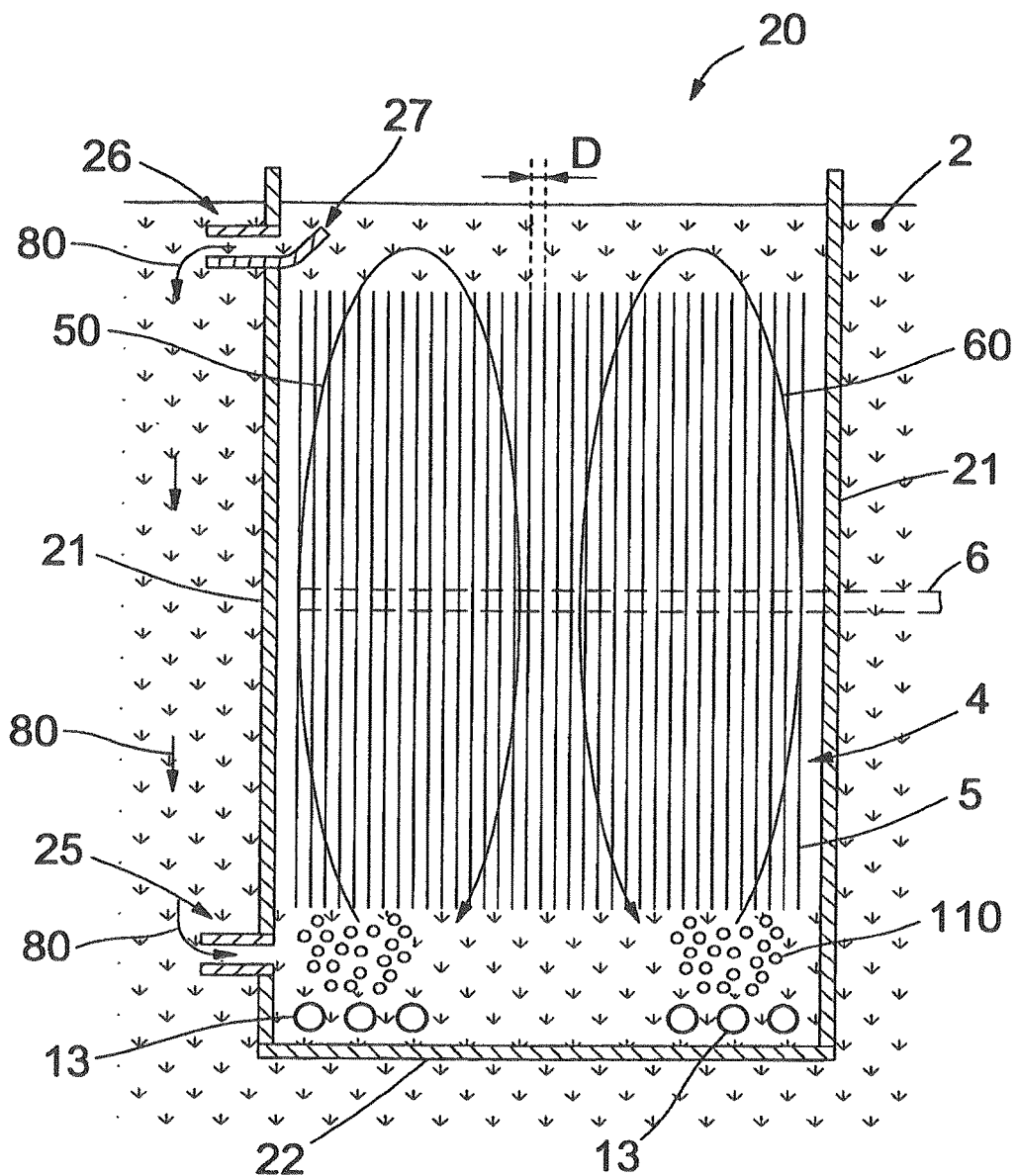

FIG. 7 shows a further example of a filtration device 20 according to the invention. The filtration device 20 comprises a housing having four substantially closed side walls 21 and a base wall 22. The filtration device 20 is preferably arranged in such a manner in the liquid 2 that is to be filtered that the upper edges of the side walls 21 project out above the surface of the liquid 2 that is to be filtered and the internal volume of the filtration device 20 is substantially closed against the surrounding liquid volume 2. In order to permit a quantitatively adjustable liquid exchange with the surroundings, at least one feed line 25 and one outlet line 26 are provided which are each arranged in one or more of the side walls 21. Preferably, the at least one feed line 25 is mounted in a lower third of the filtration device 20 at roughly the level of the gas injectors 13 of the gas lifting system. The outlet line 26, in contrast, is preferably arranged in an upper third of the filtration device 20 below and close to the surface of the liquid 2. Via the feed line 25, per unit time a volume flows into the interior of the filtration device that corresponds at least to the amount of liquid removed as permeate from the flat filter module 4. Furthermore, a shunt circuit 80 develops, the current strength of which depends on the intensity of the internal crossflow streaming 50, 60 and the geometry and arrangement, but in particular on the internal cross section, of the feed lines and outlet lines 25, 26. The shunt circuit 80 determines the liquid volume which is exchanged per unit time between the interior of the filtration device 20 and the surrounding liquid 2. Via appropriate dimensioning of the internal cross sections of the feed lines 25 and the outlet lines 26, this exchange volume can be controlled.

In order to avoid discharge of solids, in particular granules for cleaning the surfaces of the flat filter elements 5, from the interior of the filtration devices 20, the outlet line 26 is equipped with a diaphragm 27. As already explained in connection with FIG. 6, the specific density of the material of which the granule particles consist is greater than the specific density of water. Accordingly, the granule particles in the liquid 2 are only suspended or entrained upward in the rising area of the crossflow streaming 50, 60. Close to the surface of the liquid at the reversal points of the crossflow streaming 50, 60, the granule particles are entrained downward or fall downward owing to gravity. Therefore, discharge of the granule particles into the outlet line 26 can be effectively prevented using a diaphragm 27, which is preferably constructed in the manner shown in FIG. 7 as a concave element, which encloses the passageway of the outlet line 26 through the wall 21 and has an upper edge which is arranged above the passageway of the outlet line 26.

Figure 8:
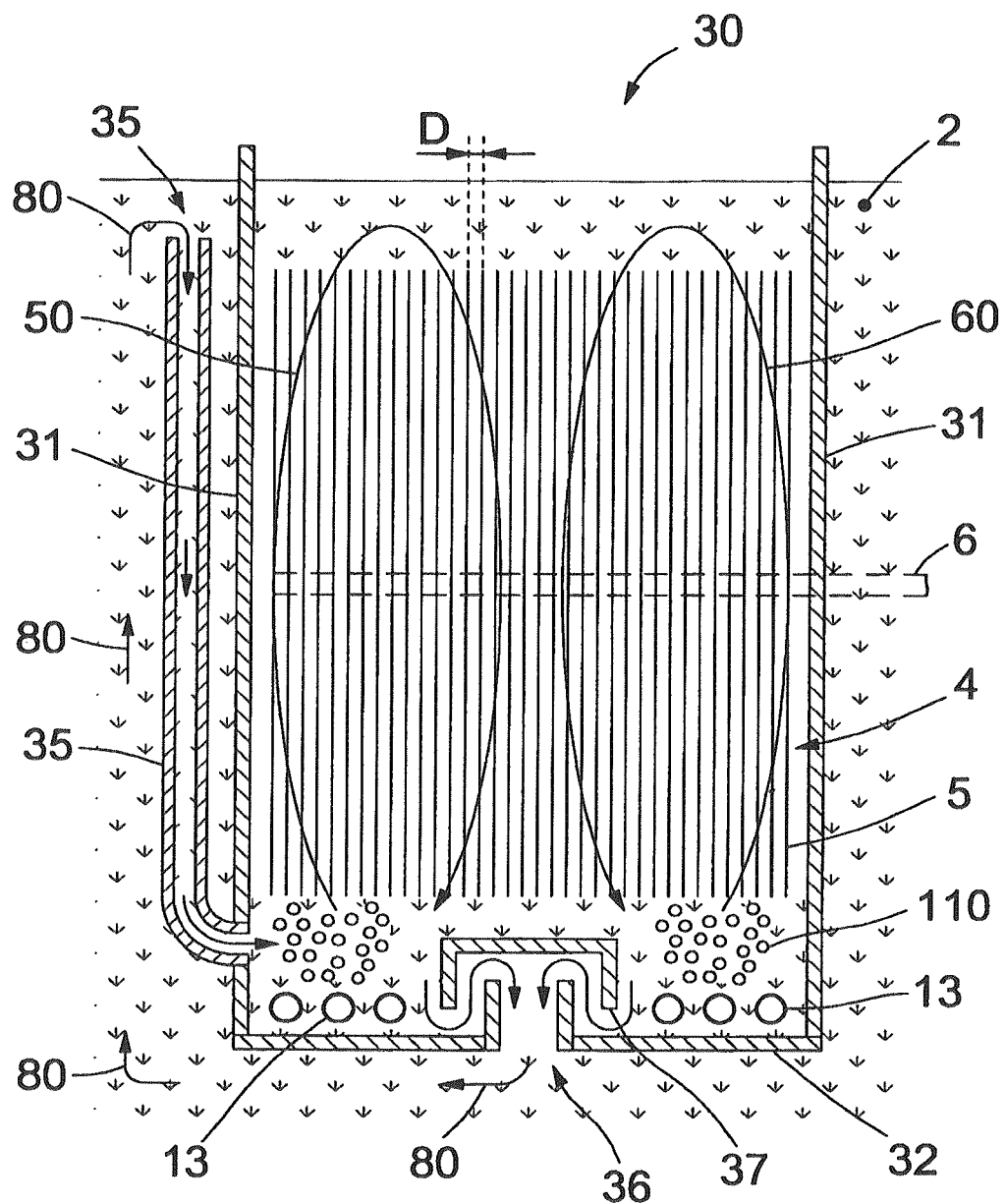

FIG. 8 shows a further example of a filtration device 30 according to the invention. The filtration device 30 comprises a housing having four substantially closed side walls 31 and a base wall 32. The filtration device 30 is preferably arranged in such a manner in the liquid 2 that is to be filtered that the upper edges of the side walls 31 project beyond the surface of the liquid 2 that is to be filtered and the internal volume of the filtration device 30 is substantially closed from the surrounding liquid volume 2. In order to permit a quantitatively adjustable liquid exchange with the surroundings, at least one feed line 35 and an outlet line 36 are provided. The at least one feed line 36 is preferably constructed so as to be tubular having an inlet opening close to the surface of the liquid 2 and a passageway to the filtration device 30 in a lower third of one of the side walls 31 close to gas injectors 13 of a gas lifting system. The outlet line 36 is arranged in the base wall 32. Expediently, the outlet line 36 is constructed in the manner of a siphon, in such a manner that feed and/or retentate flowing from the interior of the filtration device 30 outward through the outlet line 36 flows upward for at least a part section in a vertical direction. In particular, the outlet line 36 comprises a hood 37 for retaining granules, in such a manner that they are not discharged from the filtration device 30.

Expediently, the filtration devices 10, 20 and 30, similarly to the filtration device 10' shown in FIG. 6, are also equipped with a lower frame 18.

The gas injectors 13 shown in FIGS. 3 to 8 are constructed so as to be tubular, wherein the longitudinal axis of each gas injector 13 is substantially in a horizontal plane and oriented in a direction parallel to one of the lower edges of the flat filter elements 5. In a departure from the exemplary embodiments of FIGS. 3 to 8, according to the invention, filtration devices are also provided in which the longitudinal axis of each gas injector 13 is substantially in a horizontal plane and is oriented in a direction running vertically to the lower edges of the flat filter elements 5.

In FIG. 9, other examples according to the invention of feed lines and outlet lines for feed and retentate are shown.

In FIG. 9(*a*), a tubular feed line 250 constructed as a siphon type is shown which is arranged in a lower third of a side wall 21 of a filtration device of the type shown in FIG. 7. The streaming from a surrounding liquid volume into the interior of the filtration device is indicated by a direction arrow 81.

FIG. 9(*b*) shows a tubular outlet line 260 constructed as a siphon type which is arranged in an upper third of a side wall 21 of a filtration device constituted similarly to FIG. 7. The streaming from the interior of the filtration device to the surrounding liquid volume is indicated by a direction arrow 82.

In FIG. 9(*c*), a tubular outlet line 360 constructed as a siphon type is shown which is arranged in a base wall 32 of a filtration device of the type shown in FIG. 8. The streaming from the interior of the filtration device to the surrounding liquid volume is indicated by a direction arrow 83.

In addition to the examples shown in FIG. 9, according to the invention further embodiments of feed lines and outlet lines for feed and retentate are contemplated, in which a passageway through a side wall or base wall of the filtration device is surrounded by a retaining box having four walls in such a manner that a liquid which flows from the interior of the filtration device outward to a surrounding liquid volume covers a vertical part section in a direction opposite to that of gravity.

Figure 10:
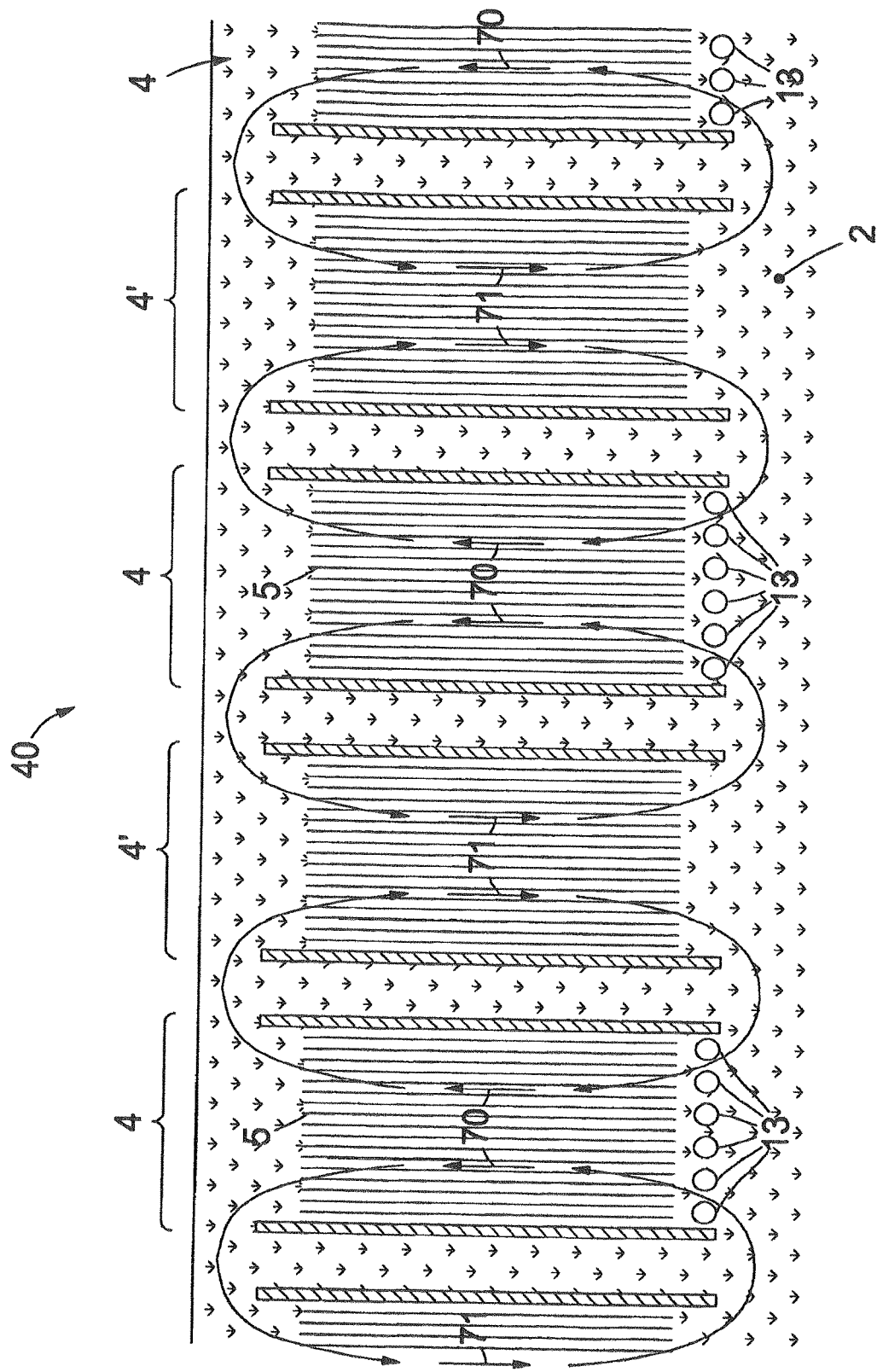
FIG. 10 shows a filtration device having flat filter modules, wherein a part of the flat filter modules is equipped with gas injectors.
Figure 11:
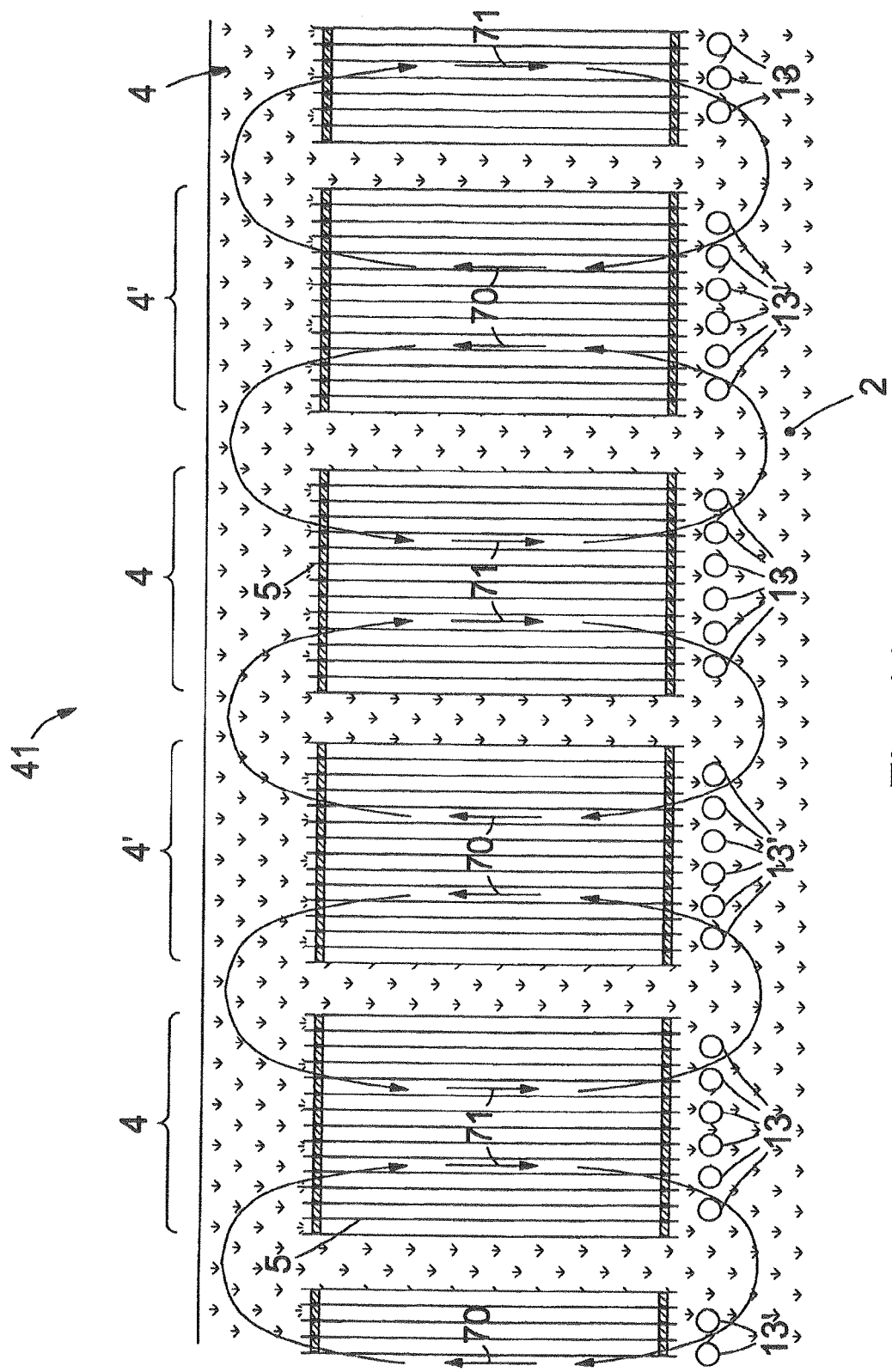
FIG. 11 shows a filtration device having flat filter modules into which gas can be injected alternately.

FIGS. 10 and 11 show further filtration devices 40 and 41 which embody the concept of the invention in a particularly expedient manner. The filtration device 40 comprises m flat filter modules 4, 4', of which n flat filter modules 4 are equipped with gas injectors 13 of a gas lifting system. The letters m and n denote natural numbers which meet the following conditions $$m \geq 2 \text{ and} \tag{a}$$

$$m > n \geq 1. \tag{b}$$

In contrast to the flat filter modules 4, the remaining (m−n) flat filter modules 4' do not have gas injectors. A gas such as air is injected via the gas injectors 13 into the flat filter modules 4, in such a manner that an upwardly directed crossflow streaming 70 develops therein which itself induces a downwardly directed crossflow streaming 71 in adjacent flat filter modules 4'. The gas injectors 13 are equipped with gas outlets 14, the vertical projections of which pass through 10 to 100%, preferably 30 to 60%, and in particular 45 to 55%, of a horizontal cross sectional area AF of each of the n flat filter modules 4.

In the filtration device 41 shown in FIG. 11, the (m−n) flat filter modules 4' are connected to gas injectors 13' of a further gas lifting system. This arrangement permits gas to be injected into the flat filter modules 4 or 4' alternately using the gas injectors 13 or 13'. Correspondingly, an upwardly directed crossflow streaming 70 or a downwardly directed crossflow streaming 71 can be generated alternately in the flat filter modules 4 or in the flat filter modules 4'.

In FIGS. 10 and 11, the flat filter modules 4 and 4' are at a distance from one another in order to make clear the modular structure of the devices 40 and 41. However, embodiments are preferred according to the invention in which the flat filter modules 4 and 4' are arranged directly, i.e. without intermediate spacing. By this means the space requirement of the device 40, 41 is decreased and the downward feedflow streaming 71 is concentrated onto the flat filter modules provided therefor in each case.

Preferably, in the filtration devices 40 and 41, in each case a flat filter module 4 and a flat filter module 4' are arranged next to one another. For this purpose, expediently, the number of flat filter modules 4 and 4' is the same, i.e. m=2·n. For example, the flat filter modules 4 and 4' are arranged in respectively adjacently situated rows, wherein a row is composed of flat filter modules 4 and a row adjacent thereto of flat filter modules 4'. In addition, arrangements are provided in which a flat filter module 4 or 4' is surrounded on the four sides thereof by four flat filter modules 4' or 4, respectively (chessboard-like arrangement).

In further advantageous embodiments of the invention, the filtration devices 10', 20, 30, 40, 41 contain granules that circulate with the crossflow streaming 50, 60 in the interior of the filtration devices 10', 20, 30, 40, 41 and mechanically remove residues, in particular a biological fouling layer (membrane fouling), adhering to the surfaces of the flat filter elements 5.

The granules consist of non-porous particles of a polymeric material having a density of 1.0 to 1.5 kg/dm$^3$, preferably 1.0 to 1.3 kg/dm$^3$, and in particular 1.0 to 1.1 kg/dm$^3$. The polymeric material is selected from a group comprising mineral-particle-containing polypropylene, polycarbonate blends, thermoplastic polyurethane elastomers, polymethyl-methacrylate, polybutylene terephthalate, polyoxymethylene, polyethylene and polyvinyl chloride. The particles of the granules have a median diameter less than 5 mm, in particular from 1.5 to 3.5 mm. The particles are produced from the respective polymer material using known granulating methods. For example, a powder, optionally mixed with fillers, of the relevant polymer or copolymer is plasticized and sprayed through a die into a precipitation bath. In this case, substantially spherical, lens-shaped or cylindrical polymer particles are generated, in which fillers are optionally embedded. The polymer particles generated are then sieved and dried. The size and surface properties of the particles are adjustable in broad ranges via the diameter of the die openings, the pressure, the composition of the precipitation bath and the process temperature. According to the invention, the particles have a surface having a median roughness Rtm of less than 40μ, preferably less than 30 μm, and in particular less than 20 μm. The median roughness Rtm of the particles is determined as specified in DIN EN ISO 4287. For carrying out the measurement, first a half-side impression is taken by means of a molding compound of at least 12 of the particles. As molding compound or impression compound, a silicone-based precision impression material, e.g. high-viscosity condensation crosslinked polysiloxane as specified in DIN 13 913 A2, ISO 4823 or Elastosil M1470 (Wacker-Chemie GmbH) is used. After curing the impression compound, a primary profile is recorded on the half-side concave impressions of the particles using a profilometer conforming to DIN EN ISO 3274 (e.g. Hommel Tester T 4000). In order to obtain a measurement section as long as possible, the measuring tip of the profilometer is placed as centrally as possible through the respective impression of a particle. The spherical, lens-shaped or cylindrical surface contour and any long-wave surface structure of the particles or the corresponding impressions present in the impression material is removed by software-supported filtering as specified in DIN EN ISO 11562 from the measured primary profile in order to obtain a roughness profile and the total height Rt thereof (maximum height between the highest peak and the lowest valley). Finally, the median roughness Rtm is determined as the median of the roughnesses Rt of the at least 12 cast particles.

The concentration of the granules in the filtration devices 10', 20, 30 is, based on the liquid volume, 1 to 10 kg/m$^3$, in particular about 3 to 5 kg/m$^3$.

The invention claimed is:

1. A device for micro-, ultra- or nanofiltration comprising one or more immersed flat filter modules, said modules comprising (i) flat filter elements arranged in parallel and at a distance from one another, (ii) one or more gas lifting systems comprising gas injectors having more than one gas outlets for generating a continuous circulating crossflow stream directed tangentially to the surface of the flat filter elements and (iii) at least one permeate line connected to said flat filter elements for passage of permeate into a permeate space, said module comprising at least two side walls having at least two side walls, wherein said module having a horizontal cross sectional are A·F of length A and width F, and wherein the gas injectors are tubular hollow bodies, each gas injector having a longitudinal axis substantially in a horizontal plane that is oriented in a direction parallel to a lower edge of the flat filter elements wherein said gas outlets are arranged in horizontally oriented contiguous surface regions and are equally spaced from each other laterally such that the lateral distance of adjacent said gas outlets is from 0.2 to 50 mm wherein the gas injectors with gas outlets of a gas lifting system are arranged beneath said filter module for giving off a gas, gas injectors with gas outlets arranged in two equally large areas B·G having a length B and a width G, wherein B extends parallel to and essentially over the full length of the flat filter elements and wherein said two equally large areas B·G are separated by a space, such that vertical projections of the gas outlets pass through 10 to 80% of a horizontal cross sectional area A·F of said module, and said filter module having at least one rising area in which the crossflow stream flows substantially vertically upward, and at least one falling area in which the crossflow stream flows essentially vertically downward, and said gas outlets are arranged such that the rising area passes through 30 to 60% of a flow volume of said module and the falling area passes through 40 to 70% of a flow volume of said module whereby said crossflows are substantially restricted within said module.

2. The device as claimed in claim 1, wherein the rising area passes through 45 to 55% of the flow volume of the flat filter modules and the falling area passes through 45 to 55%.

3. The device as claimed in claim 1, wherein said device comprises m flat filter modules, of which n flat filter modules are equipped with gas injectors of a gas lifting system, wherein m and n are natural numbers where m≥2 and m≥n≥1, the gas injectors are equipped with gas outlets and vertical projections of the gas outlets pass through 10 to 80% of a horizontal cross sectional area AF of each of the n flat filter modules.

4. The device as claimed in claim 3, wherein said vertical projections of the gas outlets pass through 30 to 60% of a horizontal cross sectional area A·F of each of the n flat filter modules.

5. The device as claimed in claim 3, wherein said vertical projections of the gas outlets pass through 45 to 55% of a horizontal cross sectional area A·F of each of the n flat filter modules.

6. The device as claimed in claim 1, wherein said module comprises a housing having a base wall.

7. The device as claimed in claim 6, wherein the housing comprises at least one feed line for feeding feed, and at least one outlet line for conveying away retentate.

8. The device as claimed in claim 7, wherein the at least one outlet line is a siphon in which retentate flowing outward from the interior of the housing through the outlet line flows vertically upward for at least a part of a section.

9. The device as claimed in claim 7, wherein the at least one outlet line is arranged in an upper third of a side wall.

10. The device as claimed in claim 9, wherein the at least one outlet line further comprises a diaphragm for retaining solids in the interior of the housing.

11. The device as claimed in claim 10, wherein, in the interior of the housing, granules for cleaning the surfaces of the flat filter elements are present.

12. The device as claimed in claim 11, further comprising at least one additional gas lifting system placed between said space of said two equally large areas B·G, wherein gas outlets of gas injectors of said additional gas lifting system are arranged below the at least one flat filter module for giving off a gas in an alternating operation to said first set of gas outlets such that vertical projections of the gas outlets pass through 90 to 20% of a horizontal cross sectional area A·F of the at least one flat filter module, thereby enabling said additional gas lifting system to reverse the direction of the circulating cross flow stream.

13. The device as claimed in claim 12, wherein said device comprises m flat filter modules, of which n flat filter modules are equipped with said gas injectors of said gas lifting system, wherein m and n are natural numbers where m≥2 and m≥2n≥1, and wherein (m−n) flat filter modules are equipped with gas injectors of said additional gas lifting system, and the gas injectors are equipped with gas outlets such that vertical projections of the gas outlets pass through 90 to 20% of a horizontal cross sectional area AF of each of the (m−n) flat filter modules.

14. The device as claimed in claim 13, wherein the gas outlets pass through 30 to 60% of a horizontal cross sectional area AF of each of the (m−n) flat filter modules.

15. The device as claimed in claim 13, wherein the gas outlets pass through 45 to 55% of a horizontal cross sectional area AF of each of the (m−n) flat filter modules.

16. The device as claimed in claim 12, wherein the vertical projections of the gas outlets pass through 70 to 40% of a horizontal cross sectional area A·F of the at least one flat filter module.

17. The device as claimed in claim 12, wherein the vertical projections of the gas outlets pass through 55 to 45% of a horizontal cross sectional area A·F of the at least one flat filter module.

18. The device as claimed in claim 11, wherein the granules are made of polymeric material having a specific density of 1.0 to 1.5 kg/dm$^3$.

19. The device as claimed in claim 7, wherein the at least one outlet line is arranged in the base wall.

20. The device as claimed in claim 19, wherein the at least one outlet line further comprises a hood for retaining solids in the interior of the housing.

21. The device as claimed in claim 7, wherein the at least one feed line is a siphon in which the feed flowing from the outside through the feed line into the interior of the housing flows downward in a vertical direction for at least a part of a section.

22. The device as claimed in claim 7, wherein said device comprises a lower frame which rests on the base of said device and determines the vertical position of said gas injectors and said flat filter module.

23. A method for the micro-, ultra- or nanofiltration of liquids through a device as claimed in claim 1 comprising one or more flat filter modules made of flat filter elements arranged in parallel and at a distance from one another, and gas injectors of one or more gas lifting systems, said method comprising directing a circulating crossflow stream tangentially toward the surface of the flat filter elements having at least one rising area in which the crossflow stream flows substantially vertically upward and at least one falling area in which the crossflow stream flows substantially vertically downward, and the rising area passes through 30 to 60% of a feed volume of the at least one flat filter module and the falling area passes through 40 to 70%.

24. The method for micro-, ultra- or nanofiltration of liquids through a device as claimed in claim 23, wherein the gas is air and vertical projections of the gas outlets pass through 30 to 60% of a horizontal cross sectional area of the at least one flat filter module.

25. The method for micro-, ultra- or nanofiltration of liquids through a device as claimed in claim 23, wherein the vertical projections of the gas outlets pass through 45 to 55% of a horizontal cross sectional area of the at least one flat filter module.

26. The device as claimed in claim 1, wherein said at least one flat filter module having a horizontal cross sectional area A·F of length A and width F, and
   wherein the gas outlets of gas injectors of the gas lifting system are arranged beneath the at least one flat filter module for giving off a gas with gas injectors arranged in two equally large areas B·G, below the right and left hand side of the flat filter module each of which having a length B and a width G, wherein B extends parallel to and essentially over the full length of the flat filter elements and wherein said two equally large areas B·G are separated by a space, such that vertical projections of said first set of as outlets pass through 45 to 55% of a horizontal cross section area A·F of the at least one flat filter module.

27. A device for micro-, ultra- or nanofiltration comprising one or more
   immersed flat filter modules, said modules comprising (i) flat filter elements arranged in parallel and at a distance from one another, (ii) one or more gas lifting systems comprising gas injectors having more than one gas outlets for generating a continuous circulating crossflow stream directed tangentially to the surface of the flat filter elements and (iii) at least one outlet line connected to the flat filter element for conveying away permeate,
   said module comprising a frame that is open on one or more sides,
   wherein said module having a horizontal cross sectional area A·F of length A and width F, and
   wherein the gas injectors are tubular hollow bodies, each gas injector having a longitudinal axis substantially in a horizontal plane that is oriented in a direction parallel to a lower edge of the flat filter elements
   wherein said gas outlets are arranged in horizontally oriented contiguous surface regions and are equally spaced from each other laterally such that the lateral distance of adjacent said gas outlets is from 0.2 to 50 mm
   wherein the gas injectors with gas outlets of a gas lifting system are arranged beneath said filter module for giving off a gas, gas injectors with gas outlets arranged in two equally large areas B·G having a length B and a width G, wherein B extends parallel to and essentially over the full length of the flat filter elements and wherein said two equally large areas B·G are separated by a space, such that vertical projections of the gas outlets pass through 10 to 80% of a horizontal cross sectional area A·F of said module, and
   said filter module having at least one rising area in which the crossflow stream flows substantially vertically upward, and at least one falling area in which the crossflow stream flows essentially vertically downward, and said gas outlets are arranged such that the rising area passes through 30 to 60% of a flow volume of said module and the falling area passes through 40 to 70% of a flow volume of said module whereby said crossflows are substantially restricted within said module.

* * * * *